United States Patent Office

3,634,496
Patented Jan. 11, 1972

3,634,496
PROCESS FOR PRODUCING VINYL ACETATE
Naoya Kominami, 27-63, 3-chome, Nakadai, Itabashi-ku, Tokyo, Japan; Hitoshi Nakajima, 2716 Aza-oyama, Ooaza-Kawarabuki, Ageo-shi, Saitama-ken, Ageo-shi, Japan; Nobuhiro Tamura, 11-21, 6-chome, Sakuradai, Nerima-ku, Tokyo, Japan; and Kusuo Ohki, 224 Shirako, Yamatomachi, Kita-adachi-gun, Saitama-ken, Yamatomachi, Japan
No Drawing. Filed June 4, 1968, Ser. No. 734,203
Claims priority, application Japan, Sept. 7, 1967, 42/57,163; Mar. 26, 1968, 43/9,195
Int. Cl. C07c *69/14*
U.S. Cl. 260—497 A    4 Claims

ABSTRACT OF THE DISCLOSURE

The production of vinyl acetate by subjecting a gas mixture containing ethylene, acetic acid and a molecular oxygen containing gas to a catalytic gas phase reaction at a temperature of from 50° to 300° C. in the presence of a catalyst composition consisting of (A) at least one metal of palladium, rhodium, ruthenium, platinum and iridium; (B) at least one of the metals, oxides, chlorides, formates and acetates of cadmium, zinc and uranium; (C) at least one of the chlorides and bromides of alkali metals; and (D) at least one of the acetates of alkali metals.

---

This invention relates to a process for producing vinyl acetate by gas phase reaction of ethylene, acetic acid and a molecular oxygen containing gas as starting materials.

The synthesis of vinyl acetate may be effected by subjecting a gas mixture containing ethylene, acetic acid and a molecular oxygen containing gas to a catalytic gas phase reaction at a temperature of from 50° to 300° C. in the presence of a catalyst composition containing of at least one of the metals palladium, platinum, rhodium, ruthenium and iridium as a main catalyst component, and at least one of the metals and oxides of copper, silver, zinc, cadmium, tin, lead, chromium, molybdenum, tungsten, iron, cobalt and nickel as a promoter, supported on a carrier (British Pat. No. 1,003,499).

However, it has been found that the above-mentioned process has a disadvantage in that the activity of the catalyst tends to decrease gradually for a prolonged reaction period. Although it is still possible to practise the above-mentioned process commercially even with the use of catalysts having such tendency to decrease in activity, the process involves the provision of equipment and operations for regenerating catalysts or recharging fresh catalysts. In addition, the loss of catalysts in the regeneration operation is disadvantageous from the economic point of view since these catalysts are very expensive.

The phenomenon of decrease in catalyst activity has been investigated and it has been discovered that the addition of at least one of the chlorides, bromides and fluorides of alkali metal to the above-mentioned catalyst compositions may reduce substantially such decrease in catalyst activity and may prolong very greatly the life of catalyst. However, according to these processes, the one pass yield of vinyl acetate is excellent but a considerable amount of acetaldehyde is by-produced, and the selectivity of vinyl acetate based on the converted carbon atom is accordingly not always high and the provision of operations for separating the by-produced acetaldehyde from vinyl acetate is required.

Other processes hitherto proposed for producing vinyl acetate include a process carried out in the liquid phase at elevated temperatures using a palladium metal as a catalyst supported on a carrier in the presence of potassium acetate from ethylene, acetic acid and oxygen as starting materials (British Pat. No. 981,987) and a process carried out in the gas phase at elevated temperatures using a palladium metal catalyst containing an alkali metal acetate and/or an alkaline earth metal acetate from ethylene, acetic acid and oxygen as starting materials (British Pat. No. 1,017,938). The process of British Pat. No. 981,987 suffers from the drawbacks that the catalyst is required in large amount for producing a desired amount of vinyl acetate because the space time yield is low. The process of British Pat. No. 1,017,938 is good in selectivity of vinyl acetate, but low in conversion of ethylene and the space time yield is accordingly very low.

Table 1 below shows a comparison in catalyst activity among the above-mentioned catalysts in the gas phase reaction and the catalyst of the present invention. It will be easily understood that the catalyst of the present invention is much further improved in conversion of ethylene and in one pass yield and selectivity of vinyl acetate.

TABLE 1

| Catalyst composition | Conversion of ethylene (mol percent) | One pass yield of vinyl acetate [1] (mol percent) | Space time yield of vinyl acetate (g./l. hr.) | One pass yield of acetaldehyde [1] (mol percent) | One pass yield of carbon dioxide [1] (mol percent) | Selectivity of vinyl acetate [2] (mol percent) |
|---|---|---|---|---|---|---|
| $\left(\text{Pd-Silica}\frac{\quad}{3}\text{KOOCCH}_3\right)$ [4] | 6.1 | 4.9 | 13.1 | | 2.4 | 80.4 |
| (Pd-KCl-Silica) [5] | 9.8 | 6.1 | 16.3 | 3.2 | 1.0 | 62.3 |
| (Pd-Zn-KCl-Silica) [5] | 11.4 | 6.8 | 18.2 | 3.8 | 0.8 | 59.7 |
| $\left(\text{Pd-Zn-KCl-Silica}\frac{\quad}{3}\text{KOOCCH}_3\right)$ [6] | 10.8 | 8.7 | 23.3 | | 4.2 | 80.5 |

[1] Based on the fed ethylene.
[2] Based on the converted ethylene.
[3] Reduced to metallic form with hydrazine at 80° C.
[4] Prepared on the basis of the description of British Patent No. 1,017,938.
[5] Reduced to metallic form with hydrogen at 500° C.
[6] Prepared in the same manner as in Example 2.

Reaction conditions:
 Catalyst—30 cc.: Palladium metal content 2.0 wt. percent; Potassium metal content 2.0 wt. percent; Zinc metal content 0.4 wt. percent (in each catalyst)
 Starting material composition—Ethylene:Acetic acid:Oxygen=7:2:1 (by mol ratio).
 Reaction temperature—150° C.
 Space velocity—100 hr.$^{-1}$
 Pressure—Atmospheric.
 Results: Over 24 hours after the start of the reaction.

It is, therefore, an object of this invention to provide a process for the production of vinyl acetate from ethylene, acetic acid and a molecular oxygen containing gas in a catalytic gas phase reaction in the presence of a suitable catalyst composition with a very greatly prolonged life of catalyst in high yields and at high selectivity, efficiently and economically.

According to the present invention a process for producing vinyl acetate comprises subjecting a gas mixture containing ethylene, acetic acid and a molecular oxygen containing gas to a catalytic gas phase reaction at a temperature of from 50° to 300° C. in the presence of a catalyst composition consisting of at least one of the metals of palladium, rhodium, ruthenium, platinum and iridium; at least one of the metals, oxides, chlorides, acetates and formates of cadmium, zinc and uranium; at least one of the chlorides and bromides of alkali metals; and at least one of the acetates of alkali metals.

The atomic ratio of the cadmium, zinc and uranium metal of the cadmium, zinc and uranium metals, oxides, chlorides, formates and acetates to the metal of palladium, rhodium, ruthenium, platinum and iridium as the main catalyst component is in the range of 0.01–100:1, preferably 0.05–30:1 and most preferably 0.1–10:1.

Examples of the chlorides, bromides and acetates of alkali metals which may be used in the process of this invention are those of lithium, sodium, potassium, rubidium and cesium.

The atomic ratio of the alkali metal of the alkali metal chlorides and bromides to the metal of the main catalyst component is in the range of 0.1–100:1, preferably 0.5–30:1, most preferably 1–10:1.

The atomic ratio of the alkali metal of the alkali metal acetate to the main catalyst component is in the range of 0.1–100:1, and preferably 0.5–20:1.

In preparing the catalyst for use in the process of this invention any of the conventional methods such as immersing method, mixing method, precipitating method or calcing method may be employed. For example, a catalyst composition consisting of platinum, zinc, potassium chloride and sodium acetate employed in the process of this invention may be obtained by preparing a mixture solution containing a desired amount of chloroplatinic acid, zinc chloride and potassium chloride, supporting them on a carrier by immersion, reducing them sufficiently with a reducing agent such as hydrogen, hydrazine or formaldehyde and subsequently immersing the resultant mixture in an aqueous potassium acetate solution and evaporating the composition thus treated to dryness. The catalyst composition may be reduced at any step prior to the addition of at least one of cadmium, zinc, uranium formates, acetates and alkali metal acetates in the course of the preparation of catalyst.

The use of a carrier is not essential but is advantageous and preferable examples of carriers are active carbon, silica, silica-alumina, alumina, titania, boria, alumina-boria and silicon carbide. Silica and active carbon are preferred.

In practising the process of this invention, no particular range of mol ratio of ethylene to oxygen is necessarily required. A mol ratio of ethylene to oxygen of 1:1 to 50:1 is preferred. Likewise, although no particular range is imposed on the proportion of ethylene to acetic acid, a mol ratio of ethylene to acetic acid of 50:1 to 1:10 is preferred.

The space velocity of the gas mixture containing ethylene, acetic acid and a molecular oxygen containing gas is preferably from 30 to 5000 hr.$^{-1}$, and most preferably ranges from about 50 to about 800 hr.$^{-1}$.

In the process of this invention, a reaction temperature is in the range of from 50° to 300° C., preferably from 80° to 200° C. At a temperature below 50° C. the rate of reaction is undesirably low, whereas at a temperature above 300° C. the side-reactions become active and the selectivity of vinyl acetate is accordingly remarkably reduced.

The ethylene used as starting material may contain a small amount of low saturated aliphatic hydrocars such as methane, ethane and propane.

Oxygen, pure or diluted with an inert gas such as nitrogen and carbon dioxide, or air may be employed as a molecular oxygen containing gas.

The reaction pressure may either be atmospheric or superatmospheric pressure so long as both the starting gases and reaction product gases are maintained at gas phase under the reaction conditions of the process of this invention.

Fixed, moving or fluidized bed systems may be employed in the reaction of the process of this invention.

This invention is further illustrated by the following examples which are in no way limiting upon the scope thereof.

EXAMPLE 1

300 cc. of granular silica gel of 5 to 15 mesh was added to an aqueous hydrochloric acid solution containing 2.7 g. of palladium chloride, 2.0 g. of zinc chloride and 10 g. of potassium chloride, and the mixture was evaporated to dryness on a hot water bath, reduced slowly with 100 cc. of an aqueous solution containing 30 cc. of hydrazine hydrate, washed with water, dried, subsequently immersed in an aqueous solution containing 5.9 g. of potassium acetate and evaporated to dryness. The resulting catalyst was charged together with quartz sand into a U-tube of stainless steel having 28 mm. inside diameter and 1.5 m. length and dried at 150° C. for 12 hours while introducing nitrogen. A gas mixture consisting of ethylene, acetic acid and oxygen at a ratio of 193 l./m., 96.5 l./m. and 36.2 l./m. (at normal temperature and pressure) was fed to the reaction tube maintained at 150° C. at a gauge pressure of 6 kg./cm.$^2$. Over 24 hours after the start of the reaction the space time yield of vinyl acetate was 140 g./l. hr., and 98.5% of the converted vinyl acetate was vinyl acetate, and the rest was carbon dioxide.

For comparison, the procedure of Example 1 was repeated using the identical reactor and reaction conditions except that the catalyst composition

(Pd—Silica—KOOCCH$_3$)

prepared by supporting 2.7 g. of palladium chloride on 300 cc. of silica gel followed by treating the resulting mixture in the same manner as in Example 1 was employed. Over 24 hours after the start of the reaction the space time yield of vinyl acetate was 64 g./l. hr. and the rest was carbon dioxide.

EXAMPLE 2

2.7 g. of palladium chloride and 3.8 g. of sodium bromide were supported on 300 cc. of silica gel by the immersion method, reduced in the same manner as in Example 1, subsequently immersed in 2.3 g. of uranium acetate and 5.9 g. of potassium acetate and evaporated to dryness. The procedure of Example 1 was repeated using the resulting catalyst composition, the identical reactor and reaction conditions, and over 24 hours after the start of the reaction the space time yield of vinyl acetate was 97 g./l. hr. and 99.2% of the converted acetic acid was vinyl acetate.

EXAMPLES 3–24

The reaction was carried out using the same reactor as in Example 1 and each catalyst composition was prepared by the same immersion method as in Example 1. Table 2 shows the reaction conditions and results over 24 hours after the start of the reaction.

TABLE 2

| Example No. | Catalyst composition (g. based on 100 cc. of a carrier) | Carrier | Reaction conditions | | | | | | | Space velocity (hr.⁻¹) | Space time yield of vinyl acetate (g./l.hr.) | Selectivity of vinyl acetate based on converted acetic acid (mol percent) |
| --- | --- | --- | --- | --- | --- | --- | --- | --- | --- | --- | --- | --- |
| | | | Temperature (°C.) | Gauge pressure (kg./cm.²) | Mol ratio | | | | | | | |
| | | | | | Ethylene | Acetic acid | Oxygen | Diluent | | | | |
| 3 | (Pt—U—LiCl)—LiOOCCH₃: 0.1–0.04–0.43–0.13 | Active carbon | 130 | 4 | 70 | 20 | 10 | ---- | | 230 | 52 | 83.1 |
| 4 | (Pd—Ru—Zn—KBr)—CsOOCCH₃: .05–0.002–0.11–0.27–0.4 | Silica | 150 | 6 | 80 | 30 | 15 | ---- | | 170 | 133 | 95.2 |
| 5 | (Rh—UCl—CsCl)—NaOOCCH₃: 0.05–0.2– 0.37–0.4 | Alumina | 140 | 3 | 30 | 10 | 5 | ---- | | 150 | 27 | 98.6 |
| 6 | (Pd—ZnO—KCl)—OOCCH₃: 0.1–0.03–0.7–0.7 | Silica | 160 | 1 | 80 | 20 | 5 | ¹10 | | 250 | 20 | 97.7 |
| 7 | (Ir—CsBr)—UOOCH—KOOCCH₃: 0.2– 0.46–0.02–0.72 | Alumina | 130 | 2 | 30 | 10 | 5 | ---- | | 150 | 14 | 91.2 |
| 8 | (Ru—Pd—UO—LiBr)—NaOOCCH₃: 0.3–0.02– 0.01–0.58–0.4 | Active carbon | 110 | 1 | 65 | 25 | 10 | ¹10 | | 300 | 7.4 | 98.5 |
| 9 | (Pd—KCl)—ZnOOCCH₃—KOOCCH₃: 0.1–0.22–0.03–0.47 | Silica | 160 | 6 | 80 | 40 | 15 | ¹5 | | 200 | 152 | 96.6 |
| 10 | (Pd—NaBr)—ZnOOCCH₃—RbOOCCH₃: 0.05–0.16–0.12–0.37 | Alumina | 145 | 4 | 70 | 20 | 10 | ---- | | 230 | 108 | 95.3 |
| 11 | (Pd—ZnCl—NaCl)—KOOCCH₃: 0.05–0.09–0.22–0.71 | Silica | 150 | 3 | 80 | 30 | 10 | ---- | | 160 | 88 | 92.9 |
| 12 | (Pd—U—LiCl)—LiOOCCH₃: 0.05–0.02– 0.16– 0.13 | do | 160 | 6 | 80 | 40 | 15 | ---- | | 200 | 137 | 94.4 |
| 13 | (Pd—ZnCl—KCl)—LiOOCCH₃: 0.05–0.14–1.12–0.26 | do | 160 | 7 | 80 | 40 | 15 | ---- | | 200 | 172 | 89.2 |
| 14 | (Pt—Ru—Zn—CsBr)—KOOCCH₃: 0.11–0.02–0.04–0.58–0.38 | Active carbon | 130 | 3 | 100 | 30 | 10 | ---- | | 350 | 45 | 90.8 |
| 15 | (Rh—Pd—Zn—NaBr)—NaOOCCH₃: 0.05–0.05–0.08–0.16–0.4 | Silica | 150 | 6 | 80 | 40 | 15 | ---- | | 200 | 165 | 94.0 |
| 16 | (Pt—Zn—KBr)—CsOOCH₃—0.1–0.04–0.26–0.4 | Alumina | 130 | 2 | 30 | 10 | 5 | ²10 | | 150 | 25 | 92.3 |
| 17 | (Pd—Pt—Cd—LiCl)—KOOCCH₃: 0.05–0.001–0.2–0.24–0.72 | Titania | 140 | 5 | 70 | 20 | 10 | ---- | | 200 | 165 | 88.2 |
| 18 | (Pd—Ru—KCl)—CdOOCCH₃—KOOCCH₃: 0.05–0.002–0.45–0.13–0.72 | Silica | 150 | ---- | 80 | 40 | 15 | ---- | | ---- | 180 | 89.0 |

TABLE 2.—Continued

| Example No. | Catalyst composition (g. based on 100 cc. of a carrier) | Carrier | Reaction conditions | | | | | | | Space velocity (hr.⁻¹) | Space time yield of vinyl acetate (g./l.hr.) | Selectivity of vinyl acetate based on converted acetic acid (mol percent) |
|---|---|---|---|---|---|---|---|---|---|---|---|---|
| | | | Temperature (° C.) | Gauge pressure (kg./cm.²) | Ethylene | Acetic acid | Oxygen | Diluent | | | | |
| | | | | | | Mol ratio | | | | | | |
| 19 | (Pd–Rh–Cd–KBr)–CsOOCCH₃: 0.05–0.001–0.03–0.4–0.4 | ...do... | 140 | 6 | 70 | 25 | 5 | ........ | | 200 | 143 | 91.3 |
| 20 | (Pd–Zn–CsCl)–LiOOCCH₃: 0.2–0.02–0.46–0.13 | Alumina | 150 | 0 | 65 | 25 | 10 | ........ | | 100 | 16 | 90.5 |
| 21 | (Pd–Pt–KBr)–CdOOCH–NaOOCCH₃: 0.05–0.0005–0.88–0.24–0.41 | Silica | 170 | 9 | 80 | 30 | 10 | ........ | | 200 | 220 | 92.6 |
| 22 | (Pd–Pt–CdO–CsCl)–KOOCCH₃: 0.05–0.01–0.02–0.37–0.46 | ...do... | 120 | 4 | 10 | 3 | 1 | ........ | | 200 | 115 | 95.6 |
| 23 | (Pd–Cd–KBr)–CsOOCCH₃: 0.008–0.2–0.1–0.4 | ...do... | 150 | 0 | 60 | 24 | 6 | ........ | | 100 | 14.1 | 94.4 |
| 24 | (Pd–CdCl₂–KCl)–CsOOCCH₃: 0.05–0.01–0.14–0.2 | ...do... | 150 | 0 | 30 | 12 | 4 | ........ | | 100 | 16.9 | 93.7 |

¹ Nitrogen.   ² Carbon dioxide.

EXAMPLE 25

100 cc. of granular silica gel was added to an aqueous hydrochloric acid solution containing 0.89 g. of palladium chloride, 0.2 g. cadmium chloride and 1.5 g. of potassium chloride, and the mixture was evaporated to dryness on a hot water bath, reduced with 100 cc. of an aqueous solution containing 10 cc. of hydrazine hydrate, washed with water and dried. 30 cc. of the resulting mixture was immersed in an aqueous solution containing 0.59 g. of potassium acetate and evaporated to dryness. The resulting catalyst was charged into a reaction tube of heat-resistance glass having 17 mm. inside diameter together with quartz sand and dried at 300° C. while introducing nitrogen gas. A gas mixture consisting of ethylene, acetic acid, oxygen and nitrogen at a mol ratio of 30:12:3:5 was fed to the reaction tube maintained at 150° C. at atmospheric pressure at a space velocity of 100 hr.⁻¹. Over 24 hours after the start of the reaction the space time yield of vinyl acetate was 14.8 g./l. hr., and 97.7% of the converted acetic acid was vinyl acetate, and the rest was carbon dioxide.

For comparison, the procedure of Example 25 was repeated using the identical reactor and reaction conditions except that the catalyst composition (Pd–Silica–KOOCCH₃) prepared by supporting 0.89 g. of palladium chloride on 100 cc. of silica gel, followed by treating the resulting mixture in the same manner as in Example 25 was employed. Over 24 hours after the start of the reaction the space time yield of vinyl acetate was 8.1 g./l. hr., and 98.1% of the converted acetic acid was vinyl acetate and the rest was carbon dioxide.

What is claimed is:

1. In a process for producing vinyl acetate which comprises subjecting a gas mixture containing ethylene, acetic acid and a molecular oxygen containing gas to a catalytic gas phase reaction at a temperature of from 50° to 300° C. in the presence of a catalyst, the improvement comprising increasing the yield of vinyl acetate by utilizing a catalyst composition consisting of a mixture of (A) a member selected from the group consisting of palladium, rhodium, ruthenium, platinum and iridium metals and mixtures thereof; (B) a member selected from the group consisting of cadmium, zinc and uranium metals, oxides, chlorides, formates and acetates and mixtures thereof; (C) a member selected from the group consisting of lithium, sodium, potassium, rubidium and cesium chlorides and bromides and mixtures thereof; and (D) a member selected from the group consisting of lithium, sodium, potassium, rubidium and cesium acetates and mixtures thereof, supported on a carrier.

2. The process of claim 1 wherein the catalyst is supported on a carrier selected from the group consisting of active carbon, silica, silica-alumina, alumina, titania, boria, alumina-boria and silicon carbide.

3. The process of claim 1 wherein the reaction is effected in the presence of an inert gas selected from the group consisting of methane, ethane, propane, nitrogen and carbon dioxide.

4. The process of claim 1 wherein the atomic ratio of the cadmium, zinc and uranium metal of the cadmium, zinc and uranium metals, oxides, chlorides, formates and acetates; the lithium, sodium, potassium, rubidium and cesium metal of the lithium, sodium, potassium, rubidium and cesium chlorides and bromides; the lithium, sodium, potassium, rubidium and cesium metal of the lithium, sodium, potassium, rubidium and cesium acetates; and the metal of palladium, rhodium, ruthenium, platinum and iridium is in the range of 0.01–100:0.1–100:0.1–100:1.

References Cited

UNITED STATES PATENTS 3,190,912   6/1965   Robinson _____ 260—497

FOREIGN PATENTS 618,071    9/1962   Belgium _____ 260—497
1,407,526  6/1965   France _____ 260—497
25/11,371  1965     Japan _____ 260—497

LORRAINE A. WEINBERGER, Primary Examiner
R. D. KELLY, Assistant Examiner